United States Patent [19]
McCurdy, Jr. et al.

[11] Patent Number: 5,906,505
[45] Date of Patent: May 25, 1999

[54] ELECTRICAL BATTERY CONNECTOR AND ENCLOSURE

[75] Inventors: William B. McCurdy, Jr.; Gene A. Timourou, both of Watertown, N.Y.

[73] Assignee: New York Air Brake Corporation, Watertown, N.Y.

[21] Appl. No.: 08/887,937

[22] Filed: Jul. 3, 1997

[51] Int. Cl.[6] .................................................. H01R 13/58
[52] U.S. Cl. ............................................ 439/500; 439/687
[58] Field of Search ..................................... 439/500, 627, 439/687; 429/121

[56] References Cited

U.S. PATENT DOCUMENTS

| | | | |
|---|---|---|---|
| 2,076,639 | 4/1937 | Heyer | 439/627 |
| 4,084,037 | 4/1978 | Morton | 429/121 |
| 4,261,634 | 4/1981 | Robinson | 439/627 |
| 4,847,170 | 7/1989 | Martin . | |
| 5,421,743 | 6/1995 | Hwang | 439/500 |

Primary Examiner—Steven L. Stephan
Assistant Examiner—Javaid Nasri
Attorney, Agent, or Firm—Barnes & Thornburg

[57] ABSTRACT

A battery connector for connection to a battery having a positive and negative terminals extending parallel to a first face of the battery. The connector includes a housing having positive and negative sockets in first and second openings in a side wall spaced the same distance as a positive and negative terminal of the battery. Protuberances extend from a first face of the housing to indicate mismatching of the sockets with the battery terminals when the first face of the housing is adjacent to the first face of the battery.

19 Claims, 3 Drawing Sheets

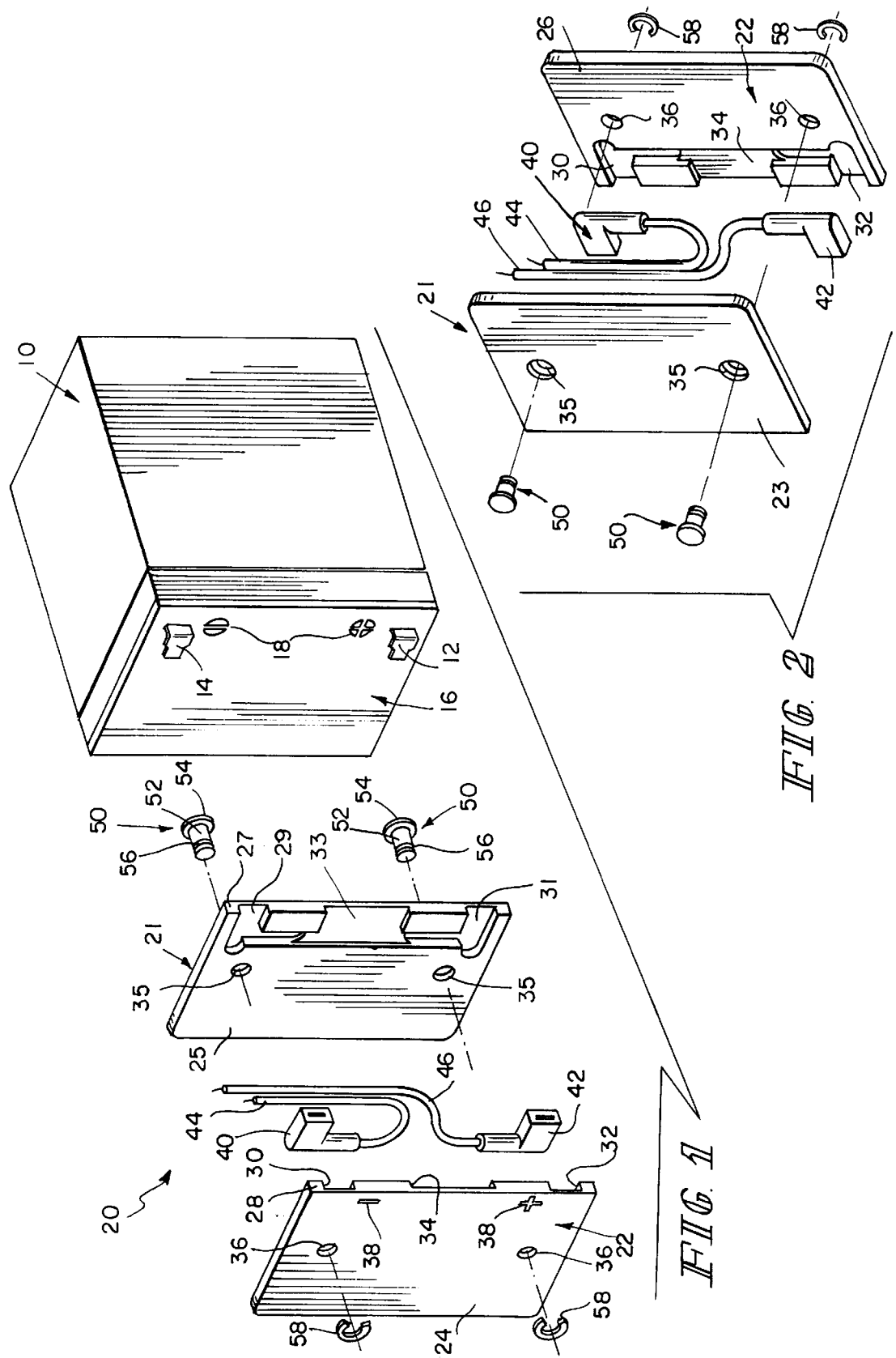

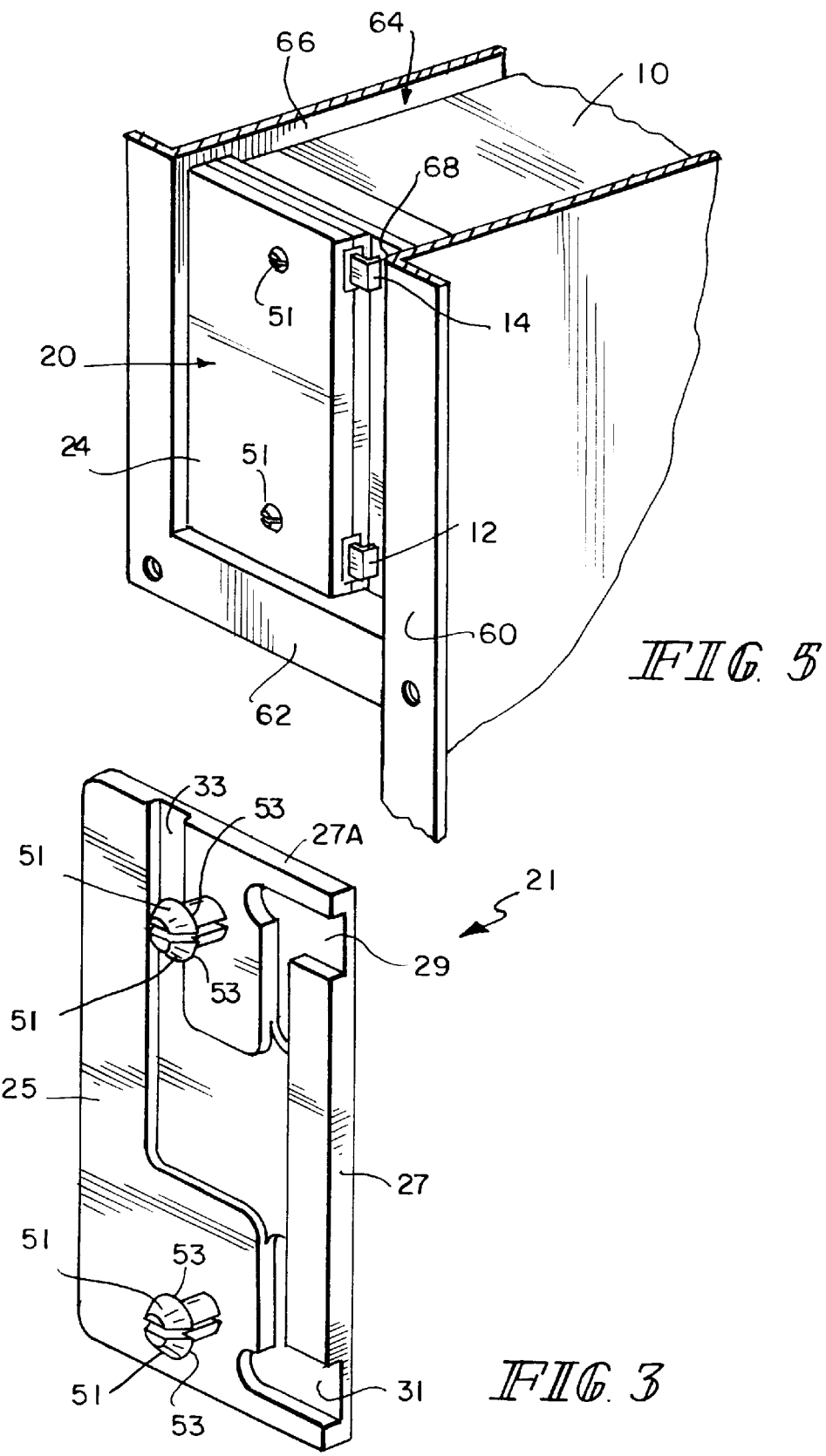

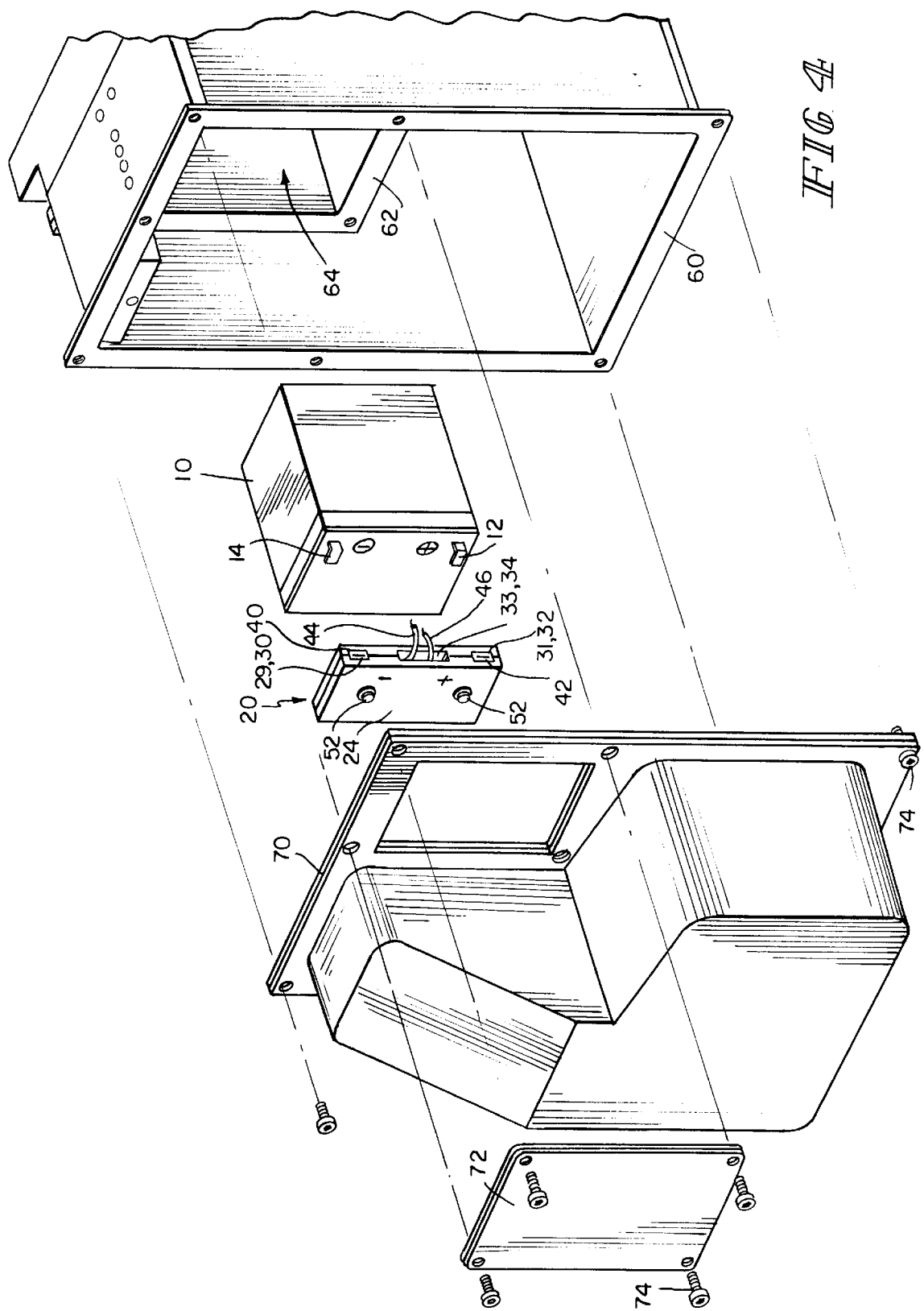

5,906,505

ELECTRICAL BATTERY CONNECTOR AND ENCLOSURE

BACKGROUND AND SUMMARY OF THE INVENTION

The present invention relates generally to electrical battery connectors and more specifically to an electrical battery connector for use in an electropneumatic brake system.

The American Association of Railroads ("AAR") has sponsored the development of electropneumatic brakes on freight trains. These brake systems generally include a microprocessor at each car to provide electrical control of the pneumatic brake system of the car. A battery is provided at each microprocessor. Due to the hostile environment, the processor, the electropneumatic control elements and the batteries must be provided in a sealed enclosure. Although the batteries may be charged from a trainline, replacement of the batteries must be easily performed and the ability to prevent misconnection of the positive and negative terminals of the battery to the system must be provided.

The present invention is a battery connector for connection to a battery having a positive and negative terminals extending parallel to a first face of the battery. The connector includes housing having a side wall with a first and second openings spaced the same distance as a positive and negative terminal of the battery. Positive and negative sockets are in the housing adjacent to and exposed by the first and second openings respectively. At least one protuberances extends from the first face of the housing to indicate mismatch of the sockets with the battery terminals when the first face of the housing is adjacent to the first face of the battery. The protuberance does not extend from the second face which allows the connectors to mate with the battery terminals when the second face is adjacent to the first face of the battery.

Preferably, there are two protuberances extending from the first face of the housing and being aligned with the respective side wall openings. Preferably, the protuberances are pins or prongs mounted to the housing. The pin includes a head and shaft and the housing includes counterbored holes through which the shaft extends with the head in the counterbore. The counterbore is in the second face of the housing. A fastener, for example, a C-ring, is on the shaft adjacent the first face and secures the pin to the housing. Where the connector housing is two plates, the pins or prongs also secures the two plates together.

The housing includes the first and second plates having the first and second housing faces and the pin joints of first and second plates together. The housing is of an insulative material. The second face of the housing is substantially co-extensive with the first face of the battery. The connectors include leads connected thereto and extend outside the housing through a third opening in the side wall. The third opening for the leads are between the first and second openings on a common side wall or on another side wall. The first, second and third openings extend across the mating faces of the two plates. The connectors are L-shaped and are received in L-shaped channels in the plates. The L-shaped channels are also connected to the third opening for the leads.

A battery enclosure for the battery includes a having a cavity opened at a front wall for receiving the battery. The connector described including the sockets form the lid of the enclosure and is substantially co-extensive with the opened front wall. This dimension locks the sockets on the terminal front wall when the battery is inserted in the closure with the second face of the lid adjacent the first face of the battery. The enclosure is part of a housing for the electropneumatic control valve which may include additional cover plates.

Other objects, advantages and novel features of the present invention will become apparent from the following detailed description of the invention when considered in conjunction with the accompanying drawings.

BRIEF DESCRIPTION OF THE DRAWINGS

FIG. 1 is an exploded perspective view of a connector incorporating the present invention with a battery.

FIG. 2 is an exploded perspective view of 180 degrees with the respective FIG. 1.

FIG. 3 is a perspective of a second embodiment of one plate of the connector.

FIG. 4 is an exploded perspective view of an enclosure for the battery in combination with the battery and the connector incorporating the principles of the present invention.

FIG. 5 is a partial cut-away perspective of the connector and battery in an enclosure.

DETAILED DESCRIPTION OF THE PREFERRED EMBODIMENT

As illustrated in FIGS. 1 and 2, a battery 10 includes a positive terminal 12 and a negative terminal 14 having portions thereof extending substantially parallel to a front face 16. A connector 20 is designed to mate with the terminals 12 and 14. The housing of the connector 20 includes plates 21 and 22, each having an exterior surface 23 and 24 and a mating interior surface 25 and 26 respectively. A side wall 27 and 28 extends between the exterior and interior surfaces and includes openings 29, 30 and 31, 32 spaced along the side wall 27. The spacing of the openings 29, 30 and 31, 32 equals the spacing between the negative terminal 14 and the positive terminal 12. An opening 33, 34 is provided in each plate to allow the leads of the connectors to extend from the housing. As shown in FIG. 1, the opening 33, 34 is in side wall 27 between the openings 29, 30 and 31, 32. The plates 21 and 22 include a pair of aligned holes or bores 35 and 36. The bore 35 of plate 21 is counterbored as illustrated in FIG. 2.

A pair of sockets 40 and 42 having leads 44 and 46 respectively rest in channels connected to the openings 29, 30, 31, 32, and 33, 34. Socket 40 is the negative socket and socket 42 is the positive socket. The sockets are L-shaped as are the passages connected to the openings. Preferably, these sockets are spade connectors. These sockets are totally insulated with the metal contacts and the connection to the leads 44 and 46 being totally surrounded by insulation. The plates 21 and 22 of the housing are also preferably made of insulative material, preferably Lexan. Other rigid strong insulative material may be used for the plates 21, 22.

A pair of pins 50 include a shaft 52 and a head 54. An annular recess 56 receives C-rings 58. When the shaft 52 is extended through openings 35 and 36, the head 54 rests in the counterbore of bores 35 and is substantially coplanar with or below the surface or face 23 of plate 21. The shaft 52 extends past the face 24 of plate 22 as illustrated in FIG. 4 to form protuberances. This extension of shaft 52 prevents face 24 from laying flat on face 16 of the battery 10 and therefore the sockets 40 and 42 cannot be connected firmly to the terminals 12 or 14. This assures the connector 20 can only be connected to the batteries 12 and 14 at the appropriate polarity with the face 21 of the housing being adjacent face 16 of the battery. As a further aid, the battery includes markings 18 including the positive and negative terminals and face 24 of the connector includes markings 38 indicating the positive and negative sockets.

Another embodiment of the connector 20 is illustrated in FIG. 3 for the plate 21. As a first modification to the connector 20 of FIGS. 1 and 2, the opening 33 for plate 21 and the corresponding opening 34 for plate 22 are on side wall 27a. The socket openings 29, 30 and 31, 32 are still in the side wall 27. As an alternative to pins 50 and C-rings 58 of FIGS. 1 and 2, the embodiment of FIG. 3 includes a pair of prongs 51 extending from face 27. Each prong 51 includes a shoulder 53. When plate 21 is combined with plate 22, the prongs 51 extend through bores 35 and 36 with the shoulder 53 coming to rest against the face 24 of plate 22. This not only forms a protuberance extending past the face 24 of plate 26, but also secures the two plates 21 and 22 together. Prongs 51 are illustrated as being formed as an integral part of the plate 21. Alternatively, the prong 51 may be a separate element received in counter-bored bore 35 in face 23 of plate 21. Similarly, it should be noted that pin 51 may be formed as an integral part of plate 21. Although a pair of prongs 51 are shown to be received in one of the bores, a single prong may be used.

As illustrated in FIG. 4, housing 60 for the electropneumatic brake includes a cover 70 and an enclosure portion 62 which includes a cavity 64 open its front walls to receive a battery. The depth of the cavity 64 is equal to the depth of the battery 10 plus the thickness of the connector 20 including the protuberance. The connector 20 is substantially co-expensive with the face 16 of the battery. The connector 20 has the same height as the battery 10 and has a width which extends from the left wall of the battery 10 up to the turn of the terminals 12 or 14 from the face 16 of the battery. As illustrated in FIG. 4, preferably, the connector extends beyond the left wall of the battery.

As the battery 10 and the connector 20 mounted thereto are slid into the cavity 64, the right wall of the battery 10 engages the right wall 68 of the cavity 64 and the left wall of the connector 20 engages the left wall 66 of the cavity 64 as illustrated in FIG. 5. Although the connector 20 extends only approximately 1/16 of an inch past the edge of the battery 10, this distance is exaggerated in FIG. 5 for purposes of illustration. This further presses the connector 20 onto the terminals 12 and 14 and prevents any lateral motion which would cause unconnecting of the connector 20 from the terminals 12 and 14. Once the battery 10 and the connector 20 are received in cavity 64, the cover plate 70 is secured by fastener 74. A cover plate 72 is secured to the cover 70 and provides access to the battery 10 and connector 20 without exposing the interior of the remainder of the electropneumatic control valve.

Although the present invention has been described and illustrated in detail, it is to be clearly understood that the same is by way of illustration and example only, and is not to be taken by way of limitation. Although the connector 20 has been designed specifically for an electropneumatic valve, it is also applicable to be used with other systems which require a battery and a connector. Also, the connector housing could be molded as a single unit about the sockets 40 and 42 and leads 44 and 46. The protuberances may be molded in the molded body or the pins or prongs may be molded in the body or secured in holes in the molded body. Also, the protuberances may be separate from the element that secures the two plates 21 and 22 together. The spirit and scope of the present invention are to be limited only by the terms of the appended claims.

What is claimed:

1. A battery connector for connection to a battery, the battery having spaced positive and negative terminals extending parallel to a first face of the battery, the connector comprising:

a housing having first and second opposed faces and at least one side wall between said faces;

said side wall having first and second openings spaced the same distance as said positive and negative terminals of said battery;

a positive and a negative socket in said housing and adjacent to and exposed by said first and second openings respectively; and at least one protuberance extending from said first face of said housing;

said protuberance preventing said positive and negative sockets from mating with respective positive and negative battery terminals when said first face of said housing is adjacent said first face of said battery and said positive and negative sockets mate with respective positive and negative battery terminals when said second face of said housing is adjacent said first face of said battery.

2. A battery connector according to claim 1, including two protuberances extending from said first face of said housing and said protuberances are aligned with a respective side wall opening.

3. A battery connector according to claim 1, wherein said protuberance is a pin mounted to said housing.

4. A battery connector according to claim 1, wherein said housing includes first and second plates having the respective first and second housing face and said protuberance is a prong which joins said first and second plates to each other and extends past said first face.

5. A battery connector according to claim 1, wherein said second face of said housing is substantially coextensive with said first face of battery.

6. A battery connector according to claim 1, including leads connected to said sockets in said housing and extending outside said housing.

7. A battery connector according to claim 1, wherein said housing includes first and second plates having respectively said first and second housing face and opposed mating faces.

8. A battery connector according to claim 1, wherein said side wall includes a third opening and leads connected to said sockets extend from said third opening.

9. A battery connector according to claim 1, wherein said housing is an insulative material.

10. A battery connector according to claim 3, wherein said pin includes a head and a shaft and said housing includes a counterbored hole through which said shaft extends with the head in the counter bore and the counterbore is in said second face of said housing.

11. A battery connector according to claim 3, wherein said housing includes first and second plates having the respective first and second housing face and said pin joins said first and second plates to each other.

12. A battery connector according to claim 7, wherein said protuberance includes an element joining said first and second plates and extending from said first faces.

13. A battery connector according to claim 11, wherein said first and second openings extend across said mating faces into each plate.

14. A battery connector according to claim 7, wherein each plate includes first and second channels connected to said first and second openings and said sockets rest in said channels.

15. A battery connector according to claim 10, a fastener on said shaft adjacent said first face securing said pin to said housing.

16. A battery connector according to claim 15, wherein said fastener is a C-ring.

17. A battery connector according to claim 14, wherein said sockets are L-shaped and said channels are L-shaped.

18. A battery connector according to claim 14, wherein said side wall includes a third opening, said first and second channels are connected to said third opening and leads connected to said sockets extend from said channels through said third opening.

19. A battery connector according to claim 8, wherein said third opening is between said first and second openings.

* * * * *